United States Patent Office 3,822,243
Patented July 2, 1974

3,822,243
SURFACE-COATING COMPOSITIONS CONTAINING 1,1-DIALKYL-2-(SUBSTITUTED INDAZOLYL-N¹-METHYL)HYDRAZINES
Pasquale P. Minieri, Woodside, N.Y., assignor to Tenneco Chemicals, Inc.
No Drawing. Continuation-in-part of application Ser. No. 201,166, Nov. 22, 1971, now Patent No. 3,766,207, which is a continuation-in-part of application Ser. No. 141,999, May 10, 1971, now Patent No. 3,741,979. This application June 15, 1973, Ser. No. 370,546
Int. Cl. C09d 3/26, 5/14
U.S. Cl. 260—89.1          10 Claims

ABSTRACT OF THE DISCLOSURE

Compounds that have the structural formula

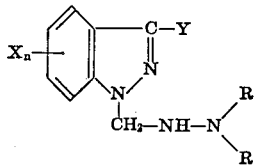

wherein X represents halogen, nitro, amino, acetamino, aroylamino, or (halobenzylidene)amino; Y represents hydrogen or halogen; each R represents a lower alkyl group; and $n$ represents an integer in the range of zero to 2 are used to protect surface-coating compositions from deterioration resulting from attack by fungi and bacteria. Illustrative of these compounds is 1,1-dimethyl-2-(5,6-dinitroindazolyl-N¹-methyl)hydrazine.

---

This is a continuation-in-part of my copending application Ser. No. 201,166, which was filed on Nov. 22, 1971 and which is now U.S. Pat. 3,766,207, and which is a continuation-in-part of copending application Ser. No. 141,999, which was filed on May 10, 1971 and which is now U.S. Pat. 3,741,979.

This invention relates to surface-coating compositions that have improved resistance to deterioration resulting from attack by fungi, bacteria, and other microorganisms. More particularly, it relates to surface-coating compositions that contain biocidal amounts of 1,1-dialkyl-2-(substituted indazolyl-N¹-methyl)hydrazines.

It is well known in the art that paints and varnishes often have inadequate resistance to the action of microorganisms. Some of these coating compositions, such as enamels and house paints, contain as their resinous binders drying oils, oleoresinous varnishes, or alkyd resins, which are subject to attack by fungi and bacteria. Others, for example, aqueous dispersions of water-insoluble synthetic linear polymers, generally contain as plasticizers and thickeners materials that have their origin in animal or vegetable sources and that render the compositions susceptible to mildew. The resulting deterioration of the surface-coating compositions seriously hinders their full scale utilization, particularly in those areas and in those applications that are conducive to such attack.

Various biocidal materials have been suggested for use in surface-coating compositions, but none has proven entirely satisfactory in this application. Some do not provide the required prolonged protection against attack by microorganisms, while others have an adverse effect on the color, odor, or viscosity of the composition undergo sulfide staining, and still others hydrolyze in alkaline aqueous paint systems or separate from the applied coating by migration, volatilization, or leaching once the coating has been spread in a thin layer over the surface to be protected.

In accordance with this invention, it has been found that 1,1-dialkyl-2-(substituted indazolyl-N¹-methyl)-hydrazines are of particular value as biocides in surface-coating compositions. These compounds, which are thoroughly compatible with the resinous binders that commonly are used in surface-coating compositions and which are resistant to sulfide staining, provide excellent and prolonged resistance to deterioration resulting from attack by fungi and bacteria without adversely affecting the color, pH, viscosity, odor, and other physical properties of the surface-coating compsitions.

The biocidal compounds that are used in the surface-coating compositions of this invention may be represented by the structural formula

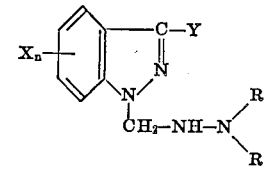

wherein X represents chlorine, bromine, fluorine, iodine, nitro, amino, acetamino, aroylamino, (chlorobenzylidene) amino, or (bromobenzylidene)amino; Y represents hydrogen, chlorine, bromine, fluorine, or iodine; each R represents an alkyl group having from 1 to 4 carbon atoms; and $n$ represents an integer in the range of zero to 2. Illustrative of these compounds are the following:

1,1-dimethyl-2-(4-acetaminoindazolyl-N¹-methyl) hydrazine;

1,1-dibutyl-2-[6-(p-chlorobenzylidene)aminoindazolyl-N¹-methyl]hydrazine;

1,1-diethyl-2-(3,5-dibromoinadozolyl-N¹-methyl) hydrazine;

1,1-dimethyl-2-(3,5,6-trichloroindazolyl-N¹-methyl) hydrazine;

1,1-dimethyl-2-(7-iodoindazolyl-N¹-methyl)hydrazine;

1,1-dimethyl-2-(5-aminoindazolyl-N¹-methyl)hydrazine;

1,1-dipropyl-2-(5,6-dinitroindazolyl-N¹-methyl)hydrazine;

1,1-dibutyl-2-(3-chloro-6-acetaminoindazolyl-N¹-methyl) hydrazine;

and the like.

The most effective of these compounds as biocides in surface-coating compositions are those represented by the structural formula

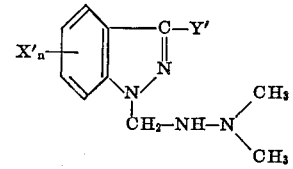

wherein X' represents chlorine or nitro, Y' represents hydrogen or chlorine, and $n$ has the aforementioned significance. Illustrative of these preferred compounds are the following:

1,1-dimethyl-2-(3-chloroindazolyl-N¹-methyl)hydrazine;
1,1-dimethyl-2-(3-chloro-5-nitroindazolyl-N¹-methyl) hydrazine;
1,1-dimethyl-2-(5,6-dinitroindazolyl-N¹-methyl) hydrazine;
1,1-dimethyl-2-(6-nitroindazolyl-N¹-methyl)hydrazine;
1,1-dimethyl-2-(5-chloroindazolyl-N¹-methyl)hydrazine;

and the like.

The biocidal compounds of this invention may be prepared by any suitable and convenient procedure. For example, they may be prepared by heating the appropriate N¹-hydroxymethyl-substituted-indazole with 1,1-dimethylhydrazine or another 1,1-dialkylhydrazine. The reaction is usually carried out in a solvent, such as benzene, toluene, pyridine, or acetone, at the reflux temperature of the reaction mixture. The $N^1$-hydroxymethyl-substituted-indiazoles may be prepared by the procedure described in U.S. Pat. 3,637,736.

In a preferred embodiment of this invention, the 1,1-dialkyl - 2 - (substituted indazolyl-$N^1$-methyl)hydrazines are used to impart fungal and bacterial resistance to dried films of protective or decorative coating compositions that have been applied to a surface. When they are added in the amount of about 0.1 percent to 5 percent, and preferably 0.25 percent to 2 percent, based on the weight of the surface-coating composition, these compounds provide excellent and prolonged resistance to deterioration resulting from attack by fungi, bacteria, and other microorganisms without adversely affecting the physical properties of the surface-coating compositions or of the dried films of these compositions.

The 1,1-dialkyl-2-(substituted indazolyl-$N^1$-methyl)hydrazines can be used to impart fungal and bacterial resistance to a wide variety of surface-coating compositions including both organic solvent-based and water-based coating systems. The surface-coating compositions generally contain about 10 percent to 60 percent by weight of an organic, water-insoluble, film-forming, resinous binder that is a linear addition polymer and/or an oleoresinous binder. Illustrative of the synthetic linear addition polymers that can be used as the binder in the compositions of this invention are the following: polyvinyl acetate; polyvinyl butyrate; polyvinyl chloride; copolymers of vinyl acetate with vinyl chloride or acrylonitrile; copolymers of vinyl chloride with acrylonitrile or vinylidene chloride; polyethylene; polyisobutylene; copolymers of styrene with butadiene, acrylonitrile, or maleic anhydride; copolymers of acrylic acid esters or methacrylic acid esters of alcohols having 1 to 8 carbon atoms with vinyl acetate, vinyl chloride, acrylonitrile, or styrene; copolymers of the aforementioned acrylic acid esters, the aforementioned methacrylic acid esters, and acrylic acid; and mixtures thereof. Suitable oleoresinous binders include drying oils, bodied drying oils, oleoresinous varnishes, alkyd resins, and mixtures thereof.

In addition to the resinous binder and the biocidal compound, the surface-coating compositions may contain various auxiliary materials, such as pigments, extenders, solvents, dyes, defoaming agents, driers, emulsifiers, plasticizers, and the like in the amounts ordinarily used for these purposes.

The biocidal compounds may be incorporated into the surface-coating compositions by any convenient procedure. For example, they can be combined with the pigments and other ingredients to form a pigment phase that is mixed with the resinous binder and water or organic solvent to form the surface-coating composition. Alternatively, they can be added to a composition that contains the resinous binder, pigment, and water or organic solvent. The biocidal compounds can be added as such to the other ingredients, or they can be added as a solution in, for example, an alcohol, ether, hydrocarbon or ketone.

The invention is further illustrated by the following examples.

EXAMPLE 1

To 200 ml. of toluene, which had been dried by azeotropic distillation, was added with stirring 18.3 grams (0.1 mole) of $N^1$-hydroxymethyl-3-chloroindazole and 6.6 grams (0.11 mole) of 99% 1,1-dimethylhydrazine. The reaction mixture was heated at its reflux temperature until 1.8 ml. of water had been evolved and then for an additional 30 minutes at this temperature. The reaction mixture was cooled and allowed to stand overnight at room temperature. It was then cooled in an ice bath and filtered. The product was dried at 50° C. under vacuum. There was obtained 9.9 grams of 1,1-dimethyl-2-(3-chloroindazolyl-$N^1$-methyl)hydrazine, which melted at 145°–150° C.

The filtrate was evaporated to dryness under reduced pressure on a water bath. The residue was crystallized from 35 ml. of toluene and dried at 50° C. under reduced pressure to yield an additional 4.0 grams of the product, which melted at 145°–150° C. The two crops of the product were combined and analyzed. The 1,1-dimethyl-2-(3-chloroindazolyl-$N^1$-methyl)hydrazine contained 54.25 percent C, 2.98 percent H, and 18.23 percent N (calculated, 56.8 percent C, 6.2 percent H, and 19.9 percent N).

EXAMPLE 2

Using the procedure described in Example 1, 18.3 grams (0.1 mole) of $N^1$-hydroxymethyl-5-chloroindazole was reacted with 6.6 grams (0.11 mole) of 99% 1,1-dimethylhydrazine. There was obtained a first crop yield of 49% and a second crop yield of 15.5% of the product. The 1,1-dimethyl - 2 - (5-chloroindazolyl-$N^1$-methyl)hydrazine obtained melted at 141°–143.5° C. and contained 54.9 percent C, 3.3 percent H, 18.13 percent N, and 23.4 percent Cl (calculated, 56.8 percent C, 6.2 percent H, 19.9 percent N, and 16.8 percent Cl).

EXAMPLES 3–8

A series of 1,1-dimethyl-2-(substituted indazolyl-$N^1$-methyl)hydrazines was prepared by the following procedure: To 150 ml. of dry toluene was added with stirring 0.1 mole of an $N^1$-hydroxymethyl-(substituted indazole) and 0.11 mole of 99% 1,1-dimethylhydrazine. The reaction mixture was heated at its reflux temperature until 1.8 ml. of water had been evolved and then for an additional 30 minutes at this temperature. The reaction mixture was cooled to room temperature and filtered. The product was dried at 50° C. under vacuum. The compounds prepared and their properties are given in Table I.

TABLE I

| Example number | Compound | Yield, percent | Melting point (° C.) |
|---|---|---|---|
| 3 | 1,1-dimethyl-2-(5-nitroindazolyl-$N^1$-methyl)hydrazine. | 98.7 | 208–213 |
| 4 | 1,1-dimethyl-2-(6-nitroindazolyl-$N^1$-methyl)hydrazine. | 66.7 | 178–180 |
| 5 | 1,1-dimethyl-2-(5,6-dinitroindazolyl-$N^1$-methyl)hydrazine. | 71.5 | |
| 6 | 1,1-dimethyl-2-(3-chloro-5-nitroindazolyl-$N^1$-methyl)hydrazine. | 61.5 | 218–223 |
| 7 | 1,1-dimethyl-2-(3-chloro-6-nitroindazolyl-$N^1$-methyl)hydrazine. | 55.6 | 206–208 |
| 8 | 1,1-dimethyl-2-(3,5,6-trichloroindazolyl-$N^1$-methyl)hydrazine. | | |

EXAMPLE 9

(A) A polyvinyl acetate emulsion paint was prepared by mixing together the following materials:

| | Parts by Weight |
|---|---|
| Water | 481.5 |
| 25% Aqueous solution of sodium salt of maleic anhydride/diisobutylene copolymer (Tamol 731) | 24 |
| Potassium pyrophosphate | 3 |
| Long chain fatty acids alkanolamide | 9 |
| Defoamer | 6 |
| Ethylene glycol | 75 |
| 1.25% Aqueous solution of hydroxymethylcellulose | 375 |
| Aqueous emulsion containing 55% of polyvinyl acetate | 1299 |
| Diethyl ether of diethylene glycol | 30 |
| Titanium dioxide | 690 |
| Talc | 345 |
| Calcium metasilicate | 150 |

This paint had the following properties as determined by standard paint testing procedures:

| | |
|---|---|
| Viscosity, K.U. | 65 |
| Brookfield Viscosity (#4 spindle, 60 r.p.m.), cps. | 800 |
| pH | 7.8 |
| Yellowness Index | 3.0 |

(B) An acrylic latex paint was prepared by mixing together the following materials:

| | Parts by Weight |
|---|---|
| Water | 168 |
| Alkyl aryl ether surfactant (Triton CF–10) | 6 |
| 25% Aqueous solution of sodium salt of maleic anhydride/diisobutylene copolymer | 27 |
| Defoamer | 12 |
| 2% Aqueous solution of hydroxyethylcellulose | 300 |
| Ethylene glycol | 60 |
| Titanium dioxide | 750 |
| Mica (waterground) | 90 |
| Calcium carbonate | 375 |
| 28% Aqueous ammonium hydroxide | 6 |
| Aqueous dispersion containing 46% acrylic ester polymer (66% ethyl acrylate, 32.5% methyl acrylate, and 1.5% acrylic acid) | 1642 |

This paint had the following properties:

| | |
|---|---|
| Viscosity, K.U. | 72 |
| Brookfield Viscosity (#3 spindle, 60 r.p.m.), cps. | 1250 |
| pH | 9.2 |
| Yellowness Index | 2.6 |

EXAMPLE 10

The paints whose preparation is described in Example 9 were evaluated by means of an agar diffusion assay. In this test, agar is inoculated with the test organism, the paint to which 2% by weight of biocide has been added is placed in a well cut from the agar, and after incubation at 28° C. and 85–95% relative humidity, the activity of the biocide is measured by zones of inhibition. The biocidal compounds tested and the results obtained are given in Table II. In this table ZO=Zone of inhibition in mm.
Tr=Trace of zone of inhibition.

TABLE II

| | Biocide | | |
|---|---|---|---|
| | Product of Ex. 4 | Product of Ex. 5 | Bis(phenyl-mercury)do-decenylsuc-cinate (Super Ad-it) |
| Polyvinyl acetate paint: | | | |
| pH of paint | 7.2 | 7.4 | 6.9 |
| Color of paint | Beige | Beige | Off-white |
| Mixed inoculum containing P. aeruginosa ATCC 10145, A. aerogenes ATCC 7256, and 3 strains of Bacillus. | ZO–1 | ZO–5 | ZO–7 |
| Bacillus subtilis | Tr | ZO–7 | ZO–10 |
| Aerobacter aerogenes | Tr | Tr | ZO–2 |
| Acrylic paint: | | | |
| pH of paint | 9.3 | 9.1 | 8.4 |
| Color of paint | Beige | Beige | Off-white |
| Mixed inoculum containing P. aeruginosa ATCC 10145, A. aerogenes ATCC 7256, and 3 strains of Bacillus. | ZO–2 | ZO–4 | ZO–6 |
| Bacillus subtilis | ZO–5 | ZO–6 | ZO–9 |
| Aerobacter aerogenes | ZO–4 | ZO–3 | ZO–1 |

Each of the other 1,1-dimethyl-2-(substituted indazolyl-N¹-methyl)hydrazines herein disclosed can be used in a similar manner to inhibit or prevent the growth of microorganisms in surface-coating compositions.

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

What is claimed is:

1. A surface-coating composition that comprises (a) an organic, water-insoluble, film-forming, resinous binder and (b) a biocidally effective amount of a biocidal compound having the structural formula

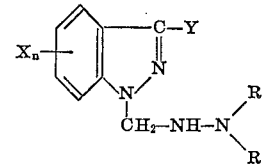

wherein X represents halogen, nitro, amino, acetamino, aroylamino, or (halobenzylidene)amino; Y represents hydrogen or halogen; each R represents an alkyl group having from 1 to 4 carbon atoms; and n represents an integer in the range of zero to 2.

2. A surface-coating composition as set forth in Claim 1 that contains 0.10 percent to 5 percent, based on the weight of the composition, of the biocidal compound.

3. A surface-coating composition as set forth in Claim 1 wherein the organic, water-insoluble, film-forming, resinous binder is selected from the group consisting of oleoresinous binders, synthetic linear addition polymers, and mixtures thereof.

4. A surface-coating composition as set forth in Claim 1 wherein the organic, water-insoluble, film-forming, resinous binder is polyvinyl acetate.

5. A surface-coating composition as set forth in Claim 1 wherein the biocidal compound has the structural formula

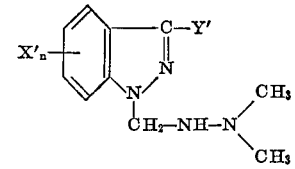

wherein X' represents chlorine or nitro, Y' represents hydrogen or chlorine, and n represents an integer in the range of zero to 2.

6. A surface-coating composition as set forth in Claim 1 wherein the biocidal compound is 1,1-dimethyl-2-(6-nitroindazolyl-N¹-methyl)hydrazine.

7. A surface-coating composition as set forth in Claim 1 wherein the biocidal compound is 1,1-dimethyl-2-(5,6-dinitroindazolyl-N¹-methyl)hydrazine.

8. A surface-coating composition as set forth in Claim 1 wherein the biocidal compound is 1,1-dimethyl-2-(3-

9. A surface-coating composition as set forth in Claim 1 wherein the biocidal compound is 1,1-dimethyl-2-(5-chlorindazolyl-N¹-methyl)hydrazine.

10. A surface-coating composition as set forth in Claim 1 wherein the biocidal compound is 1,1-dimethyl-2-(3,5,6-trichloroindazolyl-N¹-methyl)hydrazine.

References Cited

UNITED STATES PATENTS

| | | | |
|---|---|---|---|
| 3,017,415 | 1/1962 | Sarett et al. | 106—15 AF |
| 3,350,211 | 10/1967 | Greenwald | 106—15 AF |
| 3,555,040 | 1/1971 | Frick et al. | 106—15 AF |
| 3,637,736 | 1/1972 | Minieri | 106—15 AF |
| 3,641,050 | 2/1972 | Minieri | 71—82 |
| 3,646,210 | 2/1972 | Johannes | 106—15 AF |
| 3,766,192 | 10/1973 | Minieri | 106—15 AF |

HARRY WONG, JR., Primary Examiner

U.S. Cl. X.R.

106—15 AF, 17; 260—29.6 MN, 78.5 T, 85.1, 85.5 N, 86.1 R, 86.3, 86.7, 87.1, 88.7 F, 92.8 A, 94.8, 94.9 R, 310 C